(Model.)
C. REEB.
KNOT TYER FOR GRAIN BINDERS.
No. 321,639. Patented July 7, 1885.
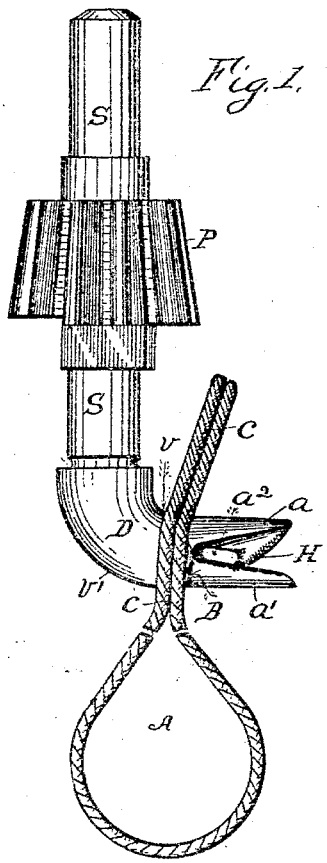
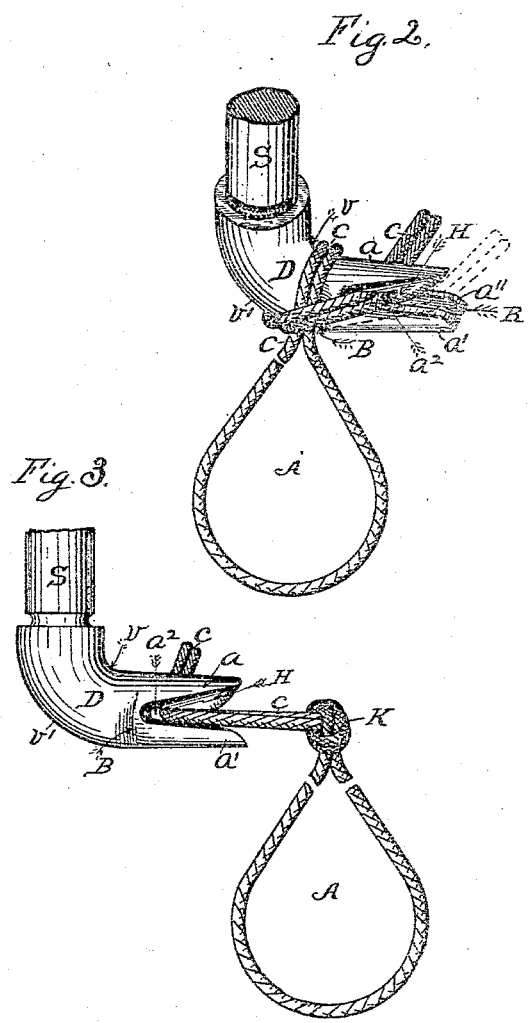
Witnesses.
Thos. H. Hutchins.
Wm. J. Hutchins.
Inventor.
Charles Reeb.

United States Patent Office.

CHARLES REEB, OF DWIGHT, ILLINOIS.

KNOT-TYER FOR GRAIN-BINDERS.

SPECIFICATION forming part of Letters Patent No. 321,639, dated July 7, 1885.

Application filed April 8, 1884. (Model.)

*To all whom it may concern:*

Be it known that I, CHARLES REEB, a citizen of the United States of America, residing at Dwight, in the county of Livingston and State of Illinois, have invented certain new and useful Improvements in Knot-Tyers for Grain-Binders, of which the following is a specification, reference being had therein to the accompanying drawings.

Figure 1 is a side elevation showing the position of the twine in relation to the knotter immediately before the knotter rotates to tie the knot. Fig. 2 is a perspective view showing the position of the twine looped about the body of the knotter-hook and in process of being tied into a knot after the knotter has been rotated and before the twine has been removed from the jaws of the knotter to complete a knot. Fig. 3 is a side view showing the twine forming the knot and band removed from off the jaws of the knotter-hook and formed into a complete knot, and also showing the manner in which the two cut-off ends of the twine are held by the knotter while the loop is slipped or pulled off.

This invention relates to certain improvements in knotters for grain-binders, which improvements are fully set forth and explained in the following specification and claim.

Referring to the drawings, D represents the body of the knotter, attached to the shaft S, provided with pinion P, which receives intermittent rotary motion in one direction from the machine to which the knotter may be attached and not necessary to be shown in order to illustrate this invention. The lower end of the knotter D terminates in a jaw consisting of the two prongs $a'$ $a''$, which are separated from each other to leave the recess or slot between them, as shown at R, Fig. 2. The knotter D is also provided with the integral jaw $a$, located over the opening R, and provided on its under side with the integral hook H, (shown in Fig. 1 most clearly.) The point of said hook extends downward into said recess or slot R between the lower prongs, $a'$ $a''$, and forward far enough to leave the opening or eye $a^2$, (shown in Fig. 1,) for the reception of the twine C. The hook H is only intended to reach down to about the upper surface of the prongs of the lower jaw, and the recess or slot R serves to permit the twine to pass under the said hook to the position shown in Fig. 2, so the hook can hold the twine in the eye $a^2$.

In operation the strands of the twine C lie over the upper jaw, $a$, in the hollow of the knotter D. At the proper time the knotter revolves from right to left in Fig. 1. One complete revolution forms the loop of the twine, as shown in Fig. 2, and the standing part of the twine passes in between the upper and lower jaws behind the hook H, as shown in said figure. The loop A incloses the bundle, and when the bundle is discharged it pulls the loop off the knotter over the portion of the twine between the jaws, thus forming the knot shown in Fig. 3 at K. The hook H holds on to the standing part of the twine until the force of the discharged bundle pulls on the twine strong enough to form a tight knot, at which moment the knife (not necessary to be shown) severs the twine, as shown in Fig. 3, and the bundle drops tied or bound. Sometimes the loop of the twine pulls off too soon from the knotter, and thus prevents the formation of the knot properly. To prevent such occurrence, the side of the knotter is provided with the elevated portion or shoulder at one side shown at B, Figs. 1 and 3. The twine will lie behind this shoulder, as shown in Figs. 1 and 2, until the loop is fully and tightly formed, where it will stay until the bundle is discharged. The knotter rotates intermittently one full revolution, and a knot is thus formed and a bundle bound and dropped at each such revolution. I do not show or describe any of the parts of the binder further because the parts that operate the knotter form no part of my invention.

My invention consists, chiefly, in the construction of the knotter having the lower jaw terminating in the two prongs $a'$ $a''$, and the upper integral jaw, $a$, having the hook H arranged as stated, and particularly in the elevated portion or shoulder B on the side of the knotter, which is a very important and useful feature, as the twine will invariably pull off the knotter too soon when it has no such shoulder, and prevents a proper knot from being tied.

I am aware that knotters of this class have been in use wherein the jaws, or some of them, are hinged or pivoted to the knotter so they may open and close, which construction I do not claim; but I am not aware of the use of a knotter of this class wherein three rigid integral jaws are arranged and used with relation to each other as in this case, or wherein the knotter to which the jaws are attached is provided with the exterior cord-retaining shoulder, B, as in this case, which is a very decided and useful improvement.

What I claim as new and desire to secure by Letters Patent is as follows, to wit:

The knotter for grain-binders having the body of the knotter D provided with the cord-retaining shoulder B on its outer side, and terminating in two fixed jaws, the upper jaw, $a$, having the retaining-hook H, and the lower jaw, $a'$ $a''$, consisting of two prongs, $a'$ $a''$, said retaining-hook standing over and between the prongs of the lower jaw, substantially as described.

CHARLES REEB.

Witnesses:
 THOS. H. HUTCHINS,
 WM. J. HUTCHINS.